United States Patent [19]

Tezuka et al.

[11] 4,341,699

[45] Jul. 27, 1982

[54] REACTIVE RED DYE HAVING BOTH MONOCHLOROTRIAZINYL- AND VINYLSULFONE-TYPE REACTIVE GROUPS

[75] Inventors: Yasuo Tezuka, Ibaraki; Masaki Sunami, Toyonaka; Takashi Omura, Ashiya; Yutaka Kayane, Moriguchi, all of Japan

[73] Assignee: Sumitomo Chemical Company, Limited, Osaka, Japan

[21] Appl. No.: 166,194

[22] Filed: Jul. 7, 1980

[30] Foreign Application Priority Data

Jul. 13, 1979 [JP] Japan .................................. 54/89650

[51] Int. Cl.$^3$ .................. C07C 107/08; C09B 62/085; C09B 62/51
[52] U.S. Cl. .................................. 260/153; 260/199; 260/194
[58] Field of Search ........................................ 260/153

[56] References Cited

U.S. PATENT DOCUMENTS 3,223,470  12/1965  Boedeker et al. ............. 260/153 X
3,544,547  12/1970  Crabtree et al. ............... 260/153 X

FOREIGN PATENT DOCUMENTS 2084024   12/1971  France ................................. 260/153
50-178     6/1975  Japan .................................. 260/153
410237    10/1966  Switzerland ........................ 260/153
1013442   12/1965  United Kingdom ................ 260/153
1119404    7/1968  United Kingdom ................ 260/153

Primary Examiner—Charles F. Warren
Attorney, Agent, or Firm—Stevens, Davis, Miller & Mosher

[57] ABSTRACT

A dye represented by a free acid of the formula,

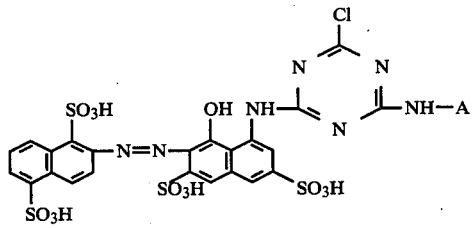

wherein A is

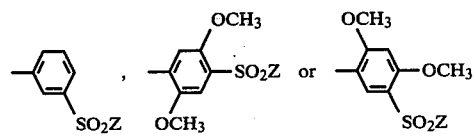

in which Z is —CH$_2$CH$_2$OSO$_3$H or —CH=CH$_2$. This dye is usable for dyeing cellulose fibers in brilliant red color with good fastness, particularly, too chlorine, light and perspiration-light and possesses level dyeing properties.

3 Claims, No Drawings

REACTIVE RED DYE HAVING BOTH MONOCHLOROTRIAZINYL- AND VINYLSULFONE-TYPE REACTIVE GROUPS

The present invention relates to a novel reactive dye usable for dyeing cellulose fiber materials in a brilliant red color.

It is well known that dyes having a β-sulfatoethylsulfone group or so-called vinylsulfone-type reactive dyes are used for dyeing fiber materials. Generally, however, materials dyed with azo red reactive dyes of this kind are not brilliant in shade, and besides they have insufficient chlorine fastness so that they often experience discoloration due to chlorine in city water. For example, a dye of this kind having the following formula (a) is known, as disclosed in U.S. Pat. No. 3,008,950:

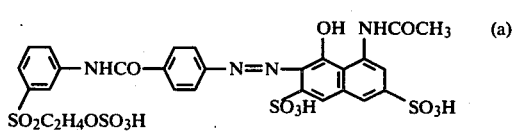

This dye is, however, not satisfactory in chlorine fastness (1st grade, ISO method).

Reactive red dyes having a monochlorotriazinyl group are also known. Generally, however, these reactive dyes require high dyeing temperatures and also lack exhaustion dyeing ability, so that they cannot produce a desired color density, when used for dip dyeing. Accordingly they are only used for printing. Besides, these dyes produce dyed materials of an insufficient acid stability. Thus, the dyes of this kind are not always satisfactory in practical use. For example, a monochlorotriazinyl reactive dye of the following formula (b) is disclosed in British Pat. No. 899,376,

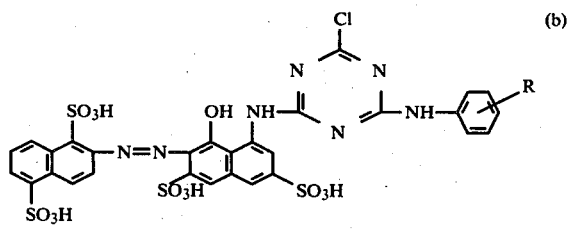

wherein R is a hydrogen or halogen atom or a sulfonic acid or methyl group. In addition, the acid stability of materials dyed with this dye is insufficient (approximately 3rd grade).

For the reasons described above, the inventors extensively studied to find a red reactive dye having a particularly superior chlorine fastness, a high acid stability, superior suitability for exhaustion dyeing and a brilliant red color. As a result, it was found that a reactive dye having both a β-sulfatoethylsulfonyl group and a monochlorotriazinyl group as reactive groups can produce red dyed material meeting these requirements.

The present invention provides a compound represented by a free acid of the formula (I),

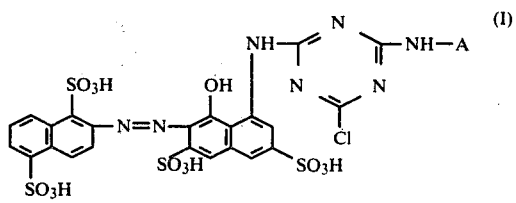

wherein A is

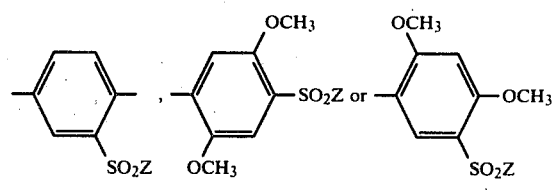

in which Z is $-CH_2CH_2OSO_3H$ or $-CH=CH_2$, and a process for producing the compound of the formula (I), which comprises, (i) reacting cyanuric chloride with 4-hydroxy-5-amino-2,7-naphthalenedisulfonic acid or an aniline compound of the formula (II), $$A-NH_2 \qquad (II)$$

wherein A is as defined above, followed by reaction with the aniline compound (II) or 4-hydroxy-5-amino-2,7-naphthalenedisulfonic acid, respectively, to obtain a monochlorotriazinyl compound of the formula (III),

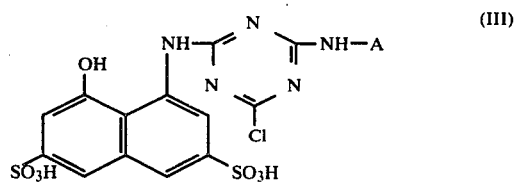

wherein A is as defined above, and reacting the monochlorotriazinyl compound (III) with diazotized 2-amino-1,5-naphthalenedisulfonic acid, (ii) reacting 4-hydroxy-5-amino-2,7-naphthalenedisulfonic acid with cyanuric chloride and successively with diazolized 2-amino-1,5-naphthalenedisulfonic acid to obtain a dichlorotriazinyl compound of the formula (IV),

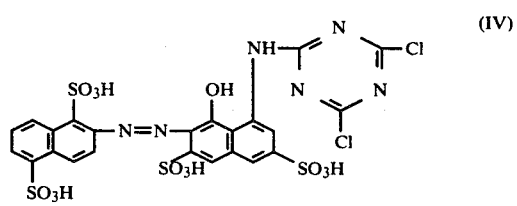

and reacting the dichlorotriazinyl compound (IV) with the aniline compound of the formula (II), (iii) reacting 4-hydroxy-5-amino-2,7-naphthalenedisulfonic acid with a diazotized 2-amino-1,5-naphthalenedisulfonic acid under an alkaline condition to obtain a monoazo compound of the formula (V),

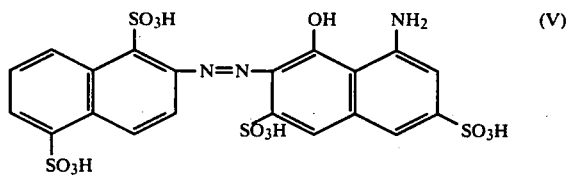

and reacting the monoazo compound (V) with cyanuric chloride and the aniline compound of the formula (II) in this order, or (iv) carrying out a reaction in a manner (i), (ii) or (iii) as defined above, excepting using an aniline compound of the formula (VI) in place of the aniline compound of the formula (II), the formula (VI) being B—NH$_2$, wherein B is

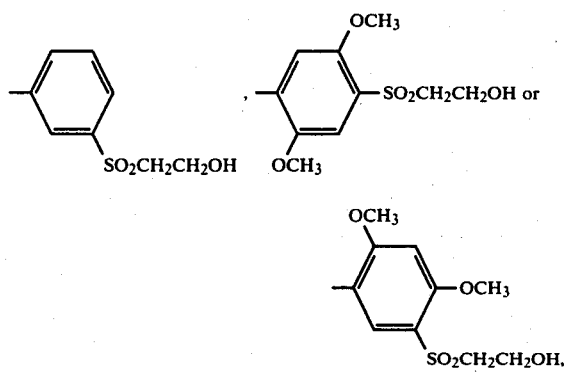

and reacting the resulting compound of the formula (VII),

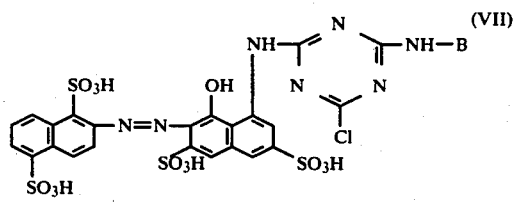

wherein B is as defined above, with sulfuric acid to obtain the compound of the formula (I) having β-sulfatoethylsulfonyl group (—SO$_2$CH$_2$CH$_2$OSO$_3$H) as Z, and, if necessary, following by elimination of sulfuric acid to obtain the compound of the formula (I) having vinyl group (—CH=CH$_2$) as Z.

The first condensation between cyanuric chloride and 4-hydroxy-5-amino-2,7-naphthalenedisulfonic acid, the aniline compound of the formula (II) or the monoazo compound of the formula (V) can be carried out at a temperature of 0°-30° C. for 1-10 hours under stirring in an aqueous medium preferably containing a surfactant while controlling the pH at 1-7 by using an acid binding agent (e.g. sodium hydroxide, sodium carbonate, sodium hydrogen carbonate or potassium carbonate). The second condensation between the obtained dichlorotriazinyl compound of the formula (VIII) or the formula (IX) and the aniline compound of the formula (II) or 4-hydroxy-5-amino-2,7-naphthalenedisulfonic acid, respectively,

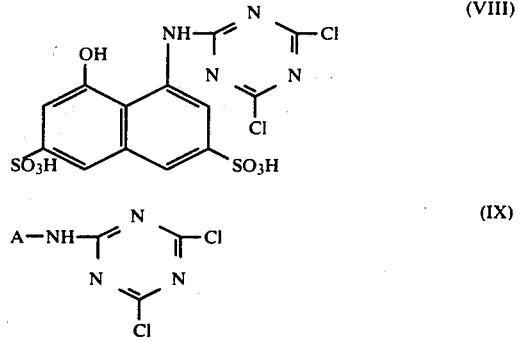

wherein A is as defined above, or between the obtained compound of formula (IV) derived from the first condensation and the anilino compound of the formula (II) can be carried out at a temperature of 5° to 60° C. for 1-10 hours under stirring while controlling the pH at 3-7 by using the same acid-binding agent as described above.

The coupling reaction of the monochlorotriazinyl compound of the formula (III) with diazotized 2-amino-1,5-naphthalenedisulfonic acid can be carried out at a temperature of 0°-30° C. for 1-10 hours under stirring while controlling the pH at 4-7 by using the same acid-binding agent as described above. The coupling reaction of the compound of formula (VIII) derived from the first condensation between cyanuric chloride and 4-hydroxy-5-amino-2,7-naphthalenedisulfonic acid with diazotized 2-amino-1,5-naphthalenedisulfonic acid can be carried out at a temperature of 0°-20° C. for 1-10 hours under stirring while controlling the pH at 4-7 by using the same acid-binding agent as described above.

In a case where the reaction is carried out by using the aniline compound of the formula (VI) in place of the aniline compound of the formula (II), the resulting compound is isolated by salting out, dried, and then esterified in excess amount of esterification agent such as sulfuric acid and/or sulfur trioxide at −5°-50° C.

The thus obtained dye of formula (I) has a structure such that a monochlorotriazinyl group is located, as a crosslinking group, between a β-sulfatoethylsulfonyl group which is a reactive group and a parent dye, and therefore the present dye can produce brilliant red dyeings which have never been obtained by conventional vinylsulfone-type reactive dyes.

Further, the present dye of the formula (I) has disulfonaphthylamine as a diazo component and therefore it has remarkably high absorbance as compared with dyes obtained using other diazo components such as substituted aniline derivatives, and has dyeing characteristics most suitable for dyeing cellulosic fibers because of the effect of the two sulfonic acid groups.

The present dyes of the formula (I) can be used for dyeing cellulose fiber materials in a brilliant red color by a conventional dyeing method such as exhaustion dyeing, printing and cold batch up dyeing. Examples of cellulose fiber materials which can be dyed in accordance with the present invention, are natural or regenerated cellulosic fibers such as cotton, flax, viscose rayon, viscose and staple fiber, and the like.

Exhaustion dyeing can be carried out at a relatively low temperature in the presence of an acid-binding agent (e.g. sodium carbonate, trisodium phosphate, sodium hydroxide) using a dyeing bath containing sodium sulfate or sodium chloride.

Further, the dyes of this invention are capable of level dyeing, can be used in a wide range of dyeing temperatures and are minimized in effect by the amount of inorganic salt and bath ratio used, hence they have good color reproducibility. When the printing process is applied to the dyeing of the present invention, the dyes of the present invention are applied to fibers together with a thickening agent (e.g. sodium alginate, starch ether) or emulsified product of the agent, an alkali agent (e.g. sodium carbonate, sodium hydrogen carbonate, sodium hydroxide, trisodium phosphate, sodium trichloroacetate, corresponding potassium or alkaline earth metal compounds) or alkali-releasing agent, and if necessary a common printing assistant (e.g. urea) or a dispersing agent, and printing is followed by drying and heat treatment particularly in the presence of steam.

The dyes of the present invention can give a dyed product superior particularly in chlorine fastness (4th grade, ISO method), light fastness and perspiration-light fastness to conventional azo red reactive dyes having a β-sulfatoethylsulfone group. Particularly, considering that the use of chlorine bleaching agent has recently become popular in washing at home, the dyes of the present invention having a superior chlorine fastness may be said to be of a high value. Further, the present dyes of superior light fastness and perspiration-light fastness are suitable for dyeing outdoor wear such as sport wear. Also, the dyes of the present invention have a high exhaustion and fixing percentage in the exhaustion dyeing, so that dyed materials with a deep hue can be obtained.

They are also distinguished by their excellent wash-off properties, easy removability of the unfixed dye and by leaving a very limited amount of residual dye in the dye bath, which indicates advantage of the dyes of this invention in respect of waste water treatment, too.

Moreover, they are distinguished by their good acid stability (4th or 4th to 5th grade).

The conventional reactive dyes with mono- or di-chlorotriazinyl groups involved the problem that the textile materials dyed therewith would be attached by acidic gas or other matters in the air and lowered in color fastness with the lapse of time, but the dyes of this invention have eliminated this problem, too.

The present invention will be illustrated with reference to the following examples, in which all parts are by weight, and the acid stability was tested as follows: A dyed cloth is dipped in a 1% acetic acid for 30 minutes and treated at 37°±2° C. for 6 hours at a pressure of 125 g/cm² using a perspirometer.

EXAMPLE 1

9.2 Parts of cyanuric chloride was suspended in ice water, and an aqueous neutral solution containing 4-amino-5-hydroxy-2,7-naphthalenedisulfonic acid (15.9 parts) was added thereto. The mixture was cooled and stirred for 5 hours while keeping the pH at 5 or less with a 20% aqueous sodium carbonate solution if necessary. Thereafter, the mixture was heated to 20° C., and after adding 3-aminophenyl-β-sulfatoethylsulfone (15 parts), it was heated to 30° C. while adjusting the pH to 5 or less with a 20% aqueous sodium carbonate solution, followed by stirring at the same temperature for 5 hours. The reaction solution was then cooled to 10° C. or less.

Separately from this, an aqueous suspension (150 parts) containing 2-amino-1,5-naphthalenedisulfonic acid (15 parts) and hydrochloric acid (10 parts) was cooled to 10° C. or less, and a solution of sodium nitrite (3.5 parts) in water (10 parts) was added thereto. After stirring the mixture at the same temperature for 3 hours, an excess of the nitrite was removed to obtain a diazo liquor.

This diazo liquor was added to the foregoing reaction solution, and the mixture was stirred for 5 hours at 10° C. or less while adjusting the pH to 6 to 7 with a 20% aqueous sodium carbonate solution. After heating to 30° C., the reaction solution was salted out with sodium chloride (150 parts). The precipitated product was filtered, washed and dried at 60° C. to obtain 60 parts of a dye having the following formula.

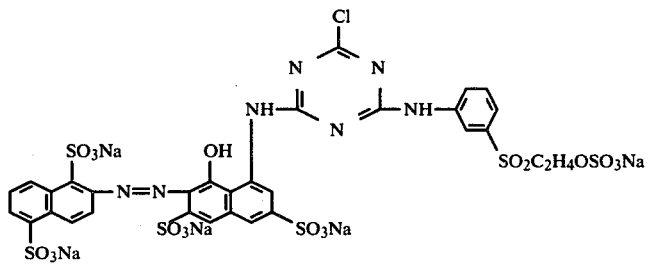

[$\lambda_{max}$=540 nm (measured in a water medium); $\lambda_{max}$ was measured in the same condition hereinafter]

EXAMPLE 2

Into an iced aqueous suspension containing cyanuric chloride (9.2 parts) was added a neutralized aqueous solution containing 4-amino-5-hydroxy-2,7-naphthalenedisulfonic acid, and the mixture was stirred under cooling for 5 hours while keeping the pH at 3 or less by the addition of a 15% aqueous solution of sodium hydroxide.

While, an aqueous suspension (150 parts) containing 2-amino-1,5-naphthalenesulfonic acid (15 parts) and hydrochloric acid (10 parts) was cooled to 10° C. or below, and then added to an aqueous solution of sodium nitrite (3.5 parts) in water (10 parts), and the mixture was stirred for 3 hours at the same temperature. Thereafter, excess nitrous acid was decomposed.

The thus prepared solution of diazonium salt was added to the foregoing reaction mixture, and the resulting mixture was stirred for 5 hours at 10° C. or below while keeping the pH at 6.5 to 7.5 by the addition of a 15% aqueous solution of sodium hydroxide. After raising the temperature of the mixture to 30° C., 4-amino- 2,5-dimethoxyphenyl β-sulfatoethylsulfone (18.6 parts) was added thereto, and the mixture was stirred for 5 hours while keeping the pH at 5 or less. The reaction mixture was salted out by the addition of sodium chloride (150 parts), and the precipitated product was separated by filtration, washed and dried to obtain 57 parts of a dye having the following formula.

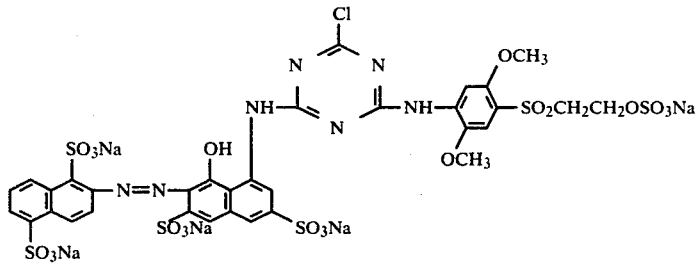

($\lambda_{max}$=540 nm)

EXAMPLE 3

Into an iced aqueous solution containing cyanuric chloride (18.5 parts) was added an aqueous solution of tetrasodium 5-amino-4-hydroxy-3-(1,5-disulfo-2-naphthylazo)-2,7-naphthalenedisulfonate (72.1 parts) which had been produced in a conventional manner using 5-amino-4-hydroxy-2,7-naphthalenedisulfonic acid as a coupling component and 2-amino-1,5-naphthalenedisulfonic acid as a diazo component, and the mixture was stirred for 7 hours under cooling while keeping the pH at 5 or less by the addition of a 15% aqueous solution of sodium hydroxide. After raising the temperature of the mixture to 20° C., 5-amino-2,4-dimethoxyphenyl β-sulfatoethylsulfone (37 parts) was added thereto. The resulting mixture was heated to 30° C. while keeping the pH at 5 or less by the addition of sodium carbonate, and stirred for 3 hours at the same temperature. The reaction mixture was salted out by the addition of sodium chloride (300 parts), and the precipitated product was separated by filtration, washed and then dried at 60° C. to obtain 123 parts of a dye of the formula,

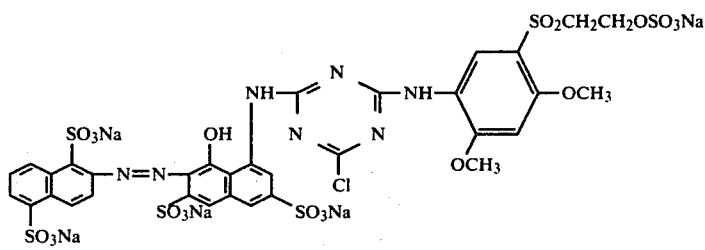

The above procedure was repeated, provided that 3-aminophenyl vinylsulfone (20 parts) was used in place of 5-amino-2,4-dimethoxyphenyl β-sulfatoethylsulfone, whereby there was obtained 101 parts of a dye having a vinylsulfonyl group in place of β-sulfatoethylsulfonyl group in the dye of Example 1.

EXAMPLE 4

Into an iced acid aqueous solution containing cyanuric chloride (9.2 parts) was added 4-amino-2,5-dimethoxyphenyl β-sulfatoethylsulfone (17 parts), and the mixture was stirred for 5 hours under cooling while keeping the pH at 5 or less by the addition of a 20% aqueous solution of sodium carbonate. After raising the temperature of the mixture to 30° C., a neutral solution containing 5-amino-4-hydroxy-2,7-naphthalenedisulfonic acid (15.9 parts) was added thereto, and the resulting mixture was stirred for 10 hours at the same temperature while keeping the pH at 6 or less. The reaction mixture was salted out by the addition of sodium chloride (75 parts) to obtain a precipitated product, which was then separated by filtration and washed. The whole amount of the product obtained was again dissolved and cooled to 10° C. or below, and to this solution was added a diazonium salt solution obtained using 2-amino-1,5-naphthalenedisulfonic acid (12 parts) in the same manner as in Example 1. The mixture was stirred for 5 hours while keeping the pH at 6 to 7 by the addition of sodium carbonate. Thereafter, the reaction mixture as such was subjected to spray-drying, and thereby 43 parts of a dye having the same formula as of Example 1 were obtained.

EXAMPLE 5

Example 4 was repeated, provided that 3-aminophenyl β-hydroxyethylsulfone (10.5 parts) was used in place of 4-amino-2,5-dimethoxyphenyl β-sulfatoethylsulfone. The resulting dye precursor (40 parts) was dissolved in sulfuric acid (400 parts) at 0° C., and the solution was poured into ice water at −5° to 0° C., then neutralized at 5° C. or less gradually to pH 6 by the addition of a 10% aqueous sodium hydroxide solution and sodium carbonate, and thereafter salted out at 30° C. by the addition of sodium chloride (450 parts). The precipitated product was separated by filtration, washed and then dried at 60° C., thereby to obtain 35 parts of a dye having the same formula as of Example 1.

EXAMPLE 6

The dye (0.3 part) obtained in Example 1 was dissolved in water (200 parts), and sodium sulfate (20 parts) and cotton (10 parts) were added to the dye liquor which was then heated to 40° C. After 30 minutes passed, sodium carbonate (4 parts) was added, and dyeing was carried out at the same temperature for 1 hour. After dyeing was finished, the dyed cotton was rinsed and soaped.

Thus, dyed materials of brilliant red color having excellent fastness to chlorine, light and perspiration-light were obtained.

EXAMPLE 7

The dye (0.3 part) obtained in Example 2 was dissolved in water (200 parts), and sodium sulfate (20 parts) and cotton (10 parts) were added to the dye liquor which was then heated to 50° C. After 20 minutes passed, trisodium phosphate (3 parts) was added, and dyeing was carried out at the same temperature for 1 hour. After dyeing was finished, the dyed cotton was rinsed and soaped to obtain dyed materials having excellent fastness to chlorine, light and perspiration-light.

EXAMPLE 8

The dye (0.3 part) obtained in ultimate paragraph of Example 3, which contains as the main component a dye of the formula,

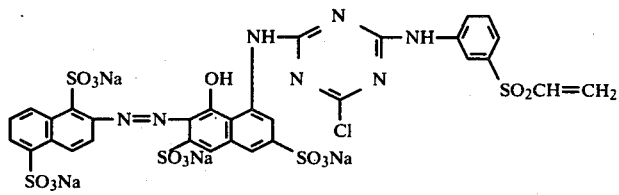

($\lambda_{max}$=540 nm) was dissolved in water (200 parts), and sodium sulfate (20 parts) and cotton (10 parts) were added to the dye liquor which was then heated to 70° C. After 20 minutes passed, sodium carbonate (4 parts) was added, and dyeing was carried out at the same temperature for 1 hour. After dyeing was finished, the dyed cotton was rinsed and soaped to obtain dyeings of brilliant red color having excellent chlorine fastness.

What is claimed is:

1. A compound represented by a free acid of the formula,

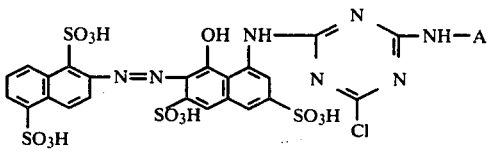

wherein A is

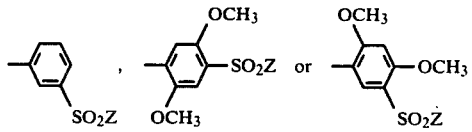

in which Z is $-CH_2CH_2OSO_3H$ or $-CH=CH_2$.

2. A compound of the formula,

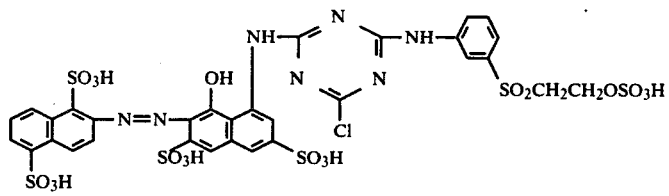

3. A compound of the formula,

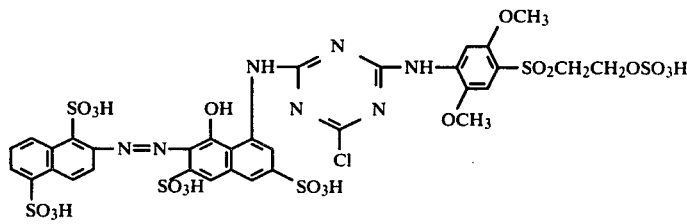

* * * * *